（12）United States Patent
Klein

(10) Patent No.: US 9,982,094 B2
(45) Date of Patent: May 29, 2018

(54) COMPOUNDS AND METHODS FOR PRODUCING NYLON 6

(71) Applicant: EMPIRE TECHNOLOGY DEVELOPMENT LLC, Wilmington, DE (US)

(72) Inventor: Josef Peter Klein, Vashon, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

(21) Appl. No.: 15/031,701

(22) PCT Filed: Oct. 22, 2013

(86) PCT No.: PCT/US2013/066171
§ 371 (c)(1),
(2) Date: Apr. 22, 2016

(87) PCT Pub. No.: WO2015/060829
PCT Pub. Date: Apr. 30, 2015

(65) Prior Publication Data
US 2016/0304669 A1 Oct. 20, 2016

(51) Int. Cl.
C08G 69/14 (2006.01)
C08G 69/08 (2006.01)
C08G 69/16 (2006.01)
C08G 69/12 (2006.01)

(52) U.S. Cl.
CPC ............. C08G 69/14 (2013.01); C08G 69/08 (2013.01); C08G 69/12 (2013.01); C08G 69/16 (2013.01)

(58) Field of Classification Search
CPC ................................ C08G 69/08; C08G 69/16
See application file for complete search history.

(56) References Cited

U.S. PATENT DOCUMENTS

| 3,853,961 | A | 12/1974 | Birkenstock et al. |
| 4,681,707 | A | 7/1987 | Alper et al. |
| 5,179,175 | A | 1/1993 | Speranza et al. |
| 5,260,246 | A | 11/1993 | Yuo et al. |
| 5,264,541 | A | 11/1993 | Yuo et al. |
| 5,346,984 | A | 9/1994 | Hasegawa et al. |
| 5,468,900 | A | 11/1995 | Moran, Jr. et al. |
| 6,011,134 | A | 1/2000 | Marks et al. |
| 6,040,392 | A | 3/2000 | Khanna et al. |
| 6,075,117 | A | 6/2000 | Hayes et al. |
| 6,331,624 | B1 | 12/2001 | Koch et al. |
| 6,362,307 | B1 | 3/2002 | Mohrschlad et al. |
| 6,437,089 | B1 | 8/2002 | Cohen et al. |
| 6,472,501 | B1 | 10/2002 | Fergusson et al. |
| 6,699,960 | B1 | 3/2004 | Ohlbach et al. |
| 6,835,800 | B2 | 12/2004 | Way et al. |
| 7,060,678 | B2 | 6/2006 | Prasad et al. |
| 7,955,479 | B2 | 6/2011 | Vanier |
| 7,977,450 | B2 | 7/2011 | Frost |
| 8,501,989 | B2 | 8/2013 | Boussie et al. |
| 8,558,018 | B2 | 10/2013 | Sanborn |
| 8,735,530 | B2 | 5/2014 | Thieblemont et al. |
| 8,859,816 | B2 | 10/2014 | Lomel |
| 9,073,844 | B2 | 7/2015 | Goossen et al. |
| 9,150,691 | B2 | 10/2015 | Jeol |
| 9,637,595 | B2 | 5/2017 | Jeol et al. |
| 2002/0183478 | A1 | 12/2002 | Fergusson et al. |
| 2003/0130478 | A1 | 7/2003 | Way et al. |
| 2003/0135018 | A1 | 7/2003 | Way et al. |
| 2004/0214982 | A1 | 10/2004 | Alsop et al. |
| 2008/0132636 | A1 | 6/2008 | Ross et al. |
| 2009/0137385 | A1 | 5/2009 | Park et al. |
| 2010/0152481 | A1 | 6/2010 | Staffel et al. |
| 2010/0317822 | A1 | 12/2010 | Boussie et al. |
| 2011/0190442 | A1 | 8/2011 | Buzinkai et al. |
| 2012/0077252 | A1 | 3/2012 | Picataggio et al. |
| 2012/0199298 | A1 | 8/2012 | Dyer |
| 2013/0095272 | A1 | 4/2013 | Carman, Jr. et al. |
| 2015/0337083 | A1* | 11/2015 | Jeol ........................ C08G 69/08 524/607 |

FOREIGN PATENT DOCUMENTS

| CN | 101679194 A | 5/2010 |
| CN | 102356113 A | 2/2012 |
| CN | 102459214 A | 5/2012 |
| CN | 102803196 A | 11/2012 |
| CN | 103025794 A | 4/2013 |
| CN | 104937010 A | 9/2015 |
| EP | 2941447 A1 | 11/2015 |
| GB | 924422 A | 4/1963 |
| WO | 02098954 A1 | 12/2002 |
| WO | 2009066975 A1 | 5/2009 |
| WO | 2010105939 A1 | 9/2010 |
| WO | 2010132740 A3 | 11/2010 |
| WO | 2010144873 A1 | 12/2010 |
| WO | 2011149339 A1 | 12/2011 |
| WO | 2012013481 A1 | 2/2012 |
| WO | 2012022801 A1 | 2/2012 |
| WO | 2013007585 A1 | 1/2013 |
| WO | 2013109447 A1 | 7/2013 |
| WO | 2014106485 A1 | 7/2014 |

OTHER PUBLICATIONS

Burlison and Blagg, "Syntesis and Evaluation of Coumermycin A1 Analogues that Inhibit the Hsp90 Protein Folding Machinery" Organic Letters (Sep. 20, 2006), 8(21) pp. 4855-4858.

Yu and Zhang, "Copper- and copper-N-heterocyclic carbene-catalyzed C—H activating carboxylation of terminal alkynes with CO2 at ambient conditions" PNAS (Nov. 23, 2010), 107(47) pp. 20184-20189.

Xing et al., "Preparation method of haloalkane, preparation method of alkyne, reaction of alkyne, preparation method of carboxylic acid" Basic Organic Chemistry, Higher Education Press (Nov. 30, 1993), pp. 153, 218-220, 222-223, 539.

Lin et al., "Acetylene synthesis method of butyl alkyne aldehyde glycol catalyst" Petrochemical Engineering (Dec. 31, 1987), 16(5) pp. 265-269.

(Continued)

Primary Examiner — Gregory Listvoyb

(57) ABSTRACT

Methods and compounds for producing nylon 6 are disclosed. Di-substituted furanic compounds may be used as the raw material for producing precursor compounds for nylon 6, and the precursor compounds are convertible to nylon 6.

17 Claims, 9 Drawing Sheets

(56) References Cited

OTHER PUBLICATIONS

Ren, "Methods of producing formaldehyde with CO2 catalytic hydrogenation" Formaldehyde and Methanol (Dec. 31, 2002), (3) pp. 13-15.
Graef et al., "Product Distribution in the Rapid Pyrolysis of Biomass/Lignin for Production of Acetylene", Biomass as a Nonfossil Fuel Source (Mar. 24, 2010), (15) pp. 293-312.
Moreau et al., Recent catalytic advances in the chemistry of substituted furans from carbohydrates and in the ensuing polymers, Topics in Catalysis (Feb. 2004), 27(1-4) pp. 11-30.
Almeida, V.R., et al., "Guiding and confining light in void nanostructure," Optics Letters, vol. 29, No. 1, pp. 1209-1211 (Jun. 1, 2004).
Anker, J.N., et al., "Biosensing with plasmonic nanosensors," Nature Materials, vol. 7, No. 6, pp. 442-453 (Jul. 2008).
Chen, S., et al.,"Plasmon-Enhanced Colorimetric ELISA with Single Molecule Sensitivity," Nano Letters, vol. 11, No. 4, pp. 1826-1830 (Mar. 23, 2011).
Cho, H-S., and Park, N-Y., "Serodiagnostic Comparison between Two Methods, ELISA and Surface Plasmon Resonance for the Detection of Antibodies of Classical Swine Fever," Journal of Veterinary Medical Science, vol. 68, No. 12, pp. 1327-1329 (Dec. 2006).
Extended European Search Report for counterpart Patent Application No. 13895980.4 dated May 17, 2017, pp. 8.
Extended European Search Report for counterpart Patent Application No. 13896041.4 dated May 16, 2017, pp. 11.
Ha, T., et al., "Single-molecule fluorescence spectroscopy of enzyme conformational dynamics and cleavage mechanism," Proc. Nall. Acad. Sci. USA, vol. 96, No. 3, pp. 893-898 (Feb. 1999).
Han, X.X., et al., "Surface-enhanced Raman scattering for protein detection," Anal. Bioanal. Chem., vol. 394, No. 7, pp. 1719-1727 (Aug. 2009).
Hao, E., and Schatz, G.C., "Electromagnetic fields around silver nanoparticles and dimmers," Journal of Chemical Physics, vol. 120, No. 1, pp. 357-366 (Jan. 1, 2004).
Homola, J., "Surface Plasmon Resonance Sensors for Detection of Chemical and Biological Species," Chem. Rev., vol. 108, No. 2, pp. 462-493. (Jan. 30, 2008).
Lakowicz, J.R., "Plasmonics in Biology and Plasmon-Conlrolled Fluorescence," Plasmonics, vol. 1, No. 1, pp. 1-70 (Mar. 22, 2006).
Lakowicz, J.R., et al., "Plasmon-controlled fluorescence: a new paradigm in fluorescence spectroscopy," The Analyst, vol. 133, No. 10, pp. 1-109 (Nov. 2008).
Li et al., "Mass Synthesis of Large, Single-Crystal Au Nanosheets Based on a Polyol Process," Advanced Functional Materials, vol. 16, No. 1, pp. 83-90 (Jan. 2008).
Lofgren, J.A., et al., "Comparing ELISA and Surface Plasmon Resonance for Assessing Clinical Immunogenicity of Panitumumab," The Journal of Immunology, vol. 178, No. 11, pp. 7467-7472 (Jun. 1, 2007).
Martelli, C., et al., "Self-assembled porphyrin microrods and observation of structure-induced iridescence," Journal of Materials Chemistry, vol. 20, Issue 12, pp. 2310-2316 (Jan. 2010).
Matveeva. E., et al., "Metal-enhanced fluorescence immunoassays using total internal reflection and silver island-coaled surfaces," Analytical Biochemistry, vol. 334, Issue. 2, pp. 303-311 (Nov. 15, 2004).
McFarland, A.D., et al., "Wavelength-Scanned Surface-Enhanced Raman Excitation Spectroscopy," The Journal of Physical Chemistry, vol. 109, No. 22, pp. 11279-11285 (May 14, 2005).
Muehlschlegel. P., et al., "Resonant Optical Antennas," Science, vol. 308, No. 5728, pp. 1607-1609 (Jun. 10, 2005).
Nooney, R., et al., "Enhancing the analytical performance of immunoassays that employ metal-enhanced fluorescence," Anal Bioanal Chem, vol. 396, Issue. 3, pp. 1127-1134. (Feb. 2010).
Rica, R.D., and Stevens, M.M., "Plasmonic ELISA for the ultrasensitive detection of disease biomarkers with the naked eye," Nature Nanotechnology, vol. 7, No. 12, pp. 821-824 (Oct. 28, 2012).

Schmitt, K., et al., "Interferometric biosensor based on planar optical waveguide sensor chips for label-free detection of surface bound bioreactions," Biosensors Bioelectronics, vol. 22, Issue. 11, pp. 2591-2597 (May 15, 2007).
Sorensen, T.J., et al., "Enhanced fluorescence emission of Me-ADOTA+ by self-assembled silver nanoparticles on a gold film," Chemical Physics Letters, vol. 476, Issue 1-3, pp. 1-12 (Jul. 7, 2009).
Stuart, D.A., et al., "Biological applications of localised surface plasmonic phenomenae," IEE Proc. Nanobiotechnol, vol. 152, Issue 1, pp. 13-32 (Feb. 2005).
The Size of the Global In Vitro Diagnostic Market Was in Excess of US$ 38 Billion, accessed at http://www.reuters.com/article/idUS107243+27-May-2008+BW20080527, posted on May 27, 2008, pp. 3.
Walker, D.P., et al., "Synthesis of (±)-8-0xa-3-azabicyclo[3.2.I]octan-2-thione and (±)-2-0xa-5-azabicyclo[2.2.I] heptan-6-thione: Potential Synthons for the Preparation of Novel Heteroaryl-Annulated Bicyclic Morpholines," Synthesis, vol. 2011, No. 7, pp. 1113-1119 (Mar. 8, 2011).
Wallrabe and Periasamy, "Imaging protein molecules using FRET and FLIM microscopy," Current Opinion in Biotechnology, vol. 16, No. 1, pp. 19-27 (Feb. 2005).
Wu, F.B., et al., "Double-antigen sandwich lime-resolved immunofluorometric assay for the detection of anti-hepatitis C virus total antibodies with improved specificity and sensitivity," Journal of Medical Microbiology (2008), vol. 57, No. 8, pp. 947-953 (Aug. 2008).
Yang, W-H., et al., "Discrete dipole approximation for calculating extinction and Raman intensities for small particles with arbitrary shapes," The Journal of Chemical Physics, vol. 103, Issue. 3, pp. 869-875 (Jul. 15, 1995).
Zhou, L. et al., "Enhancement of Immunoassay's Fluorescence and Detection Sensitivity Using Three-Dimensional Plasmonic Nano-Antenna-Dots Array," Analytical Chemistry, vol. 84, No. 10, pp. 4489-4495 (Apr. 20, 2012).
Zolotavin, P., et al., "Two-photon luminescence enhancement of silver nanoclusters photodeposiled onto mesoporous TiO2 film," Chemical Physics Letters, vol. 457, No. 4-6, pp. 342-346 (May 2008).
Amarasekara et al., Efficient oxidation of 5-hydroxymethylfurfural to 2,5-diformylfuran using Mn(III)-salen catalysts, Catalysis Communications(2008), (9) pp. 286-288.
Aoyama and Novak, Another Synthesis Route to New Materials: Hydrogenation of Heteroaromatic Polymers, accessed at http://www.iiis.org/cds2008/cd2008sci/SCI2008/PapersPdf/S464BA.pdf, accessed on Apr. 29, 2016, pp. 1-3.
Aoyama and Novak, Pyridine Rings as Protected 2° Amines: Facile Hydrogenation of Heterocyclic Aromatic Polymers, Macromolecules (2001), (34) pp. 6842-6844.
Block et al., Perthio- and perseleno-1,3-butadienes, -but-1-ene-3-ynes, and -[3]-cumulenes: One-step synthesis from 1,4-dilithio-1,3-butadiynes, Organic Letters (Mar. 27, 2003), 5(8) pp. 1325-1327.
Boustead, Eco-profiles of the European Plastics Industry: Polyamide 6 (Nylon 6), PlasticsEurope (Mar. 2005), pp. 1-15.
Brasholz et al., Highly efficient dehydration of carbohydrates to 5-(chloromethyl)furfural (CMF), 5-(hydroxymethyl) furfural (HMF) and levulinic acid by biphasic continuous flow processing, Green Chemistry (2011), 13(5) pp. 1114-1117.
Buntara et al., Caprolactam from Renewable Resources: Catalytic Conversion of 5-Hydroxymethylfurfural into Caprolactone, Angewandte Chemie International Edition (Jul. 25, 2011), 50(31) pp. 7083-7087.
Chakraborty et al., Cyclic trimer of 5-(aminomethyl)-2-furancarboxylic acid as a novel synthetic receptor for carboxylate recognition, Tetrahedron Letters (Feb. 11, 2002), 43(7) pp. 1317-1320.
Chang et al., The ethynylation of formaldehyde in a three-phase slurry reactor, Chemical Engineering Science (Sep.-Oct. 1992), 47(13-14) pp. 3793-3800.
Chu et al., Kinetics of the synthesis of 1,4-butynediol over copper-bismuth/magnesium silicate catalyst, Applied Catalysis A: General (Apr. 23, 1993), 97(2) pp. 123-132.

(56) References Cited

OTHER PUBLICATIONS

Dangerfield et al., Protecting-Group-Free Synthesis of Amines: Synthesis of Primary Amines from Aldehydes via Reductive Amination, Journal of Organic Chemistry (Jul. 28, 2010), 75(16) pp. 5470-5477.
Gehlsen and Bates, Heterogeneous Catalytic Hydrogenation of Poly(styrene): Thermodynamics of Poly (vinylcyclohexane) Containing Diblock Copolymers, Macromolecules (1993), (26) 4122-4127.
Georgieff and Richard, Diacetylene: Preparation, Purification, and Ultraviolet Spectrum, Canadian Journal of Chemistry (Sep. 1958), 36(9) pp. 1280-1283.
Herzog and Smiley, Hexamethylenediamine, Ullmann's Encyclopedia of Industrial Chemistry (2011), pp. 1-5.
Homsi and Rousseau, Halodecarboxylation of α,β-acetylenic and α,β-ethylenic acids, Tetrahedron Letters (Feb. 19, 1999), 40(8) pp. 1495-1498.
International Search Report and Written Opinion for International Application No. PCT/US2013/066171 dated Feb. 21, 2014.
International Search Report and Written Opinion for International Application No. PCT/US2013/066136 dated Feb. 24, 2014.
International Search Report and Written Opinion for International Application No. PCT/US2013/066827 dated Mar. 3, 2014.
Izumi, Recent advances in the photocatalytic conversion of carbon dioxide to fuels with water and/or hydrogen using solar energy and beyond, Coordination Chemistry Reviews (Jan. 2013), 257(1) pp. 171-186.
Janka et al., Synthesis of Neutral Molecular Squares Composed of Bis(phosphine)platinum Corner Units and Dialkynyl Linkers. Solid-State Characterization of [Pt(μ-C≡CC≡C)(dppp)]4, Organometallics (Aug. 18, 2004), 23(19) pp. 4382-4390.
Kohan et al., Polyamides, Ullmann's Encyclopedia of Industrial Chemistry (2012), (28) pp. 537-572.
Lapina et al., Reactions of alkyl (halomethyl)furancarboxylates with hexamethylenetetramine, Russian Journal of Genereal Chemistry (Aug. 2006), 76(8) pp. 1304-1309.
Lewkowski, Synthesis, chemistry and applications of 5-hydroxymethylfurfural and its derivatives, ARKIVO (2001), 2001(1) pp. 17-54.
Lichtenthaler, Carbohydrates as organic raw materials, Ullmann's Encyclopedia of Industrial Chemistry (2012), (6) pp. 583-616.
Manjolinho et al., Catalytic C—H carboxylation of terminal alkynes with carbon dioxide, American Chemical Society Catalysis (Aug. 13, 2012), 2(9) pp. 2014-2021.
Mares and Sheehan, Kinetics of Caprolactam Formation From 6-Aminocaproic Acid, Ester, and Amide, Industrial & Engineering Chemistry Process Design and Development (Jan. 1978), 17(1) pp. 9-16.
Maretina and Trofimov, Diacetylene: a candidate for industrially important reactions, Russian Chemical Reviews (Jul. 2000), 69(7) pp. 591-608.
Mascal and Nikitin, Direct, high-yield conversion of cellulose into biofuel, Angew Chem Int Ed Engl. (2008), 47(41) pp. 7924-7926.
Mascal and Nikitin, Dramatic advancements in the saccharide to 5-(chloromethyl)furfural conversion reaction, ChemSusChem (2009), 2(9) pp. 859-861.
Mascal and Nikitin, Towards the efficient, total glycan utilization of biomass, ChemSusChem (2009), 2(5) pp. 423-426.
Mei et al., TEMPO-Mediated Oxidation of Primary Alcohols to Carboxylic Acids by Exploitation of Ethers in an Aqueous-Organic Biphase System, Bulletin of the Chemical Society of Japan (2009), 82(8) pp. 1000-1002.
Mitiakoudis and Gandini, Synthesis and characterization of furanic polyamides, Macromolecules (Feb. 1991), 24(4) pp. 830-835.
Musser, Adipic Acid, Ullmann's Encyclopedia of Industrial Chemistry (2005), pp. 1-11.
Passler et al., Acetylene, Ullmann's Encyclopedia of Industrial Chemistry (2012), (1) pp. 277-326).
Ritz et al., Caprolactam, Ullmann's Encyclopedia of Industrial Chemistry (2012), pp. 1-20.
Sakurai et al., DNA-Templated Functional Group Transformations Enable Sequence-Programmed Synthesis Using Small-Molecule Reagents, Journal of American Chemical Society (Jan. 22, 2005), 127(6) pp. 1660-1661.
Stang and Learned, Generation and trapping of an alkatrienylidenecarbene, Journal of the Chemical Society, Chemical Communications (1988), (4) pp. 301-302.
Tashiro et al., Reduction of Unsaturated Aliphatic Mono- and Dicarboxylic Acids and Brominated Aliphatic Acids with Raney Alloys in an Alkaline Solution, Affording the Corresponding Saturated Aliphatic Acids, Rep. Inst. Advanced Material Study (Dec. 1988), 2(2) pp. 261-268.
Van Swieten et al., Development of an isotope-coaded activity-based probe for the quantitative profiling of cysteine proteases, Bioorganic & Medicinal Chemistry Letters (Jun. 21, 2004), 14(12) pp. 3131-3134.
Yang et al., Conversion of biomass into 5-hydroxymethylfurfural using solid acid catalyst, Bioresource Technology (Feb. 2011), 102(3) pp. 3424-3429.
Zakrzewska et al., Ionic Liquid-Mediated Formation of 5-Hydroxymethylfurfural—A Promising Biomass-Derived Building Block, Chemical Reviews (Oct. 25, 2010), 111(2) pp. 397-417.
Zhang et al., Selective Oxidation of Benzylic Alcohols and TBDMS Ethers to Carbonyl Compounds with $CrO_3$—$H_5IO_6$, Synthesis (2005), (11) pp. 1757-1760.
Zhao et al., A Novel Chromium Trioxide Catalyzed Oxidation of Primary Alcohols to Carboxylic Acids, Tetrahedron Letters (Jul. 23, 1998), 39(30) pp. 5323-5326.
Johnson, A.W., "218. 2-butyne-1: 4-diol. Part I. Reactions of the hydroxyl groups," Journal of the Chemical Society (Resumed), pp. 1009-1014 (1946).
Nozoe, T., et. al., "Non-solvent hydrogenation of solid alkenes and alkynes with supported palladium catalysts," Solid State Ionics, vol. 141-142, pp. 695-700 (May 1, 2001).
Moore, J.A. and Partain III, E.M., "Ion-Binding Polyesters and Polyamides Containing THF Rings," in the Crown Ethers and Phase Transfer Catalysis in Polymer Science, pp. 291-327, Mathihas, L. and Carraher, C.E, eds., Polymer Science and Technology (Sep. 1984).
CNOA, Third Office Action in CN Application No. 201380080411.X dated Feb. 2, 2018, 8 pages.

\* cited by examiner

COMPOUNDS AND METHODS FOR PRODUCING NYLON 6

CROSS-REFERENCE TO RELATED APPLICATIONS

This application is a U.S. national stage filing under 35 U.S.C. § 371 of International Application No. PCT/US2013/066171 filed on Oct. 22, 2013 entitled "COMPOUNDS AND METHODS FOR PRODUCING NYLON 6," which is incorporated herein by reference in its entirety.

BACKGROUND

Nylon is a designation for a family of synthetic polymers known as aliphatic polyamides, and is one of the most commonly used polymers. The chemical constituents of nylon include carbon, hydrogen, nitrogen, and oxygen. Nylons may include condensation copolymers, such as nylon 6,6, that may be formed by reacting a diamine and a dicarboxylic acid so that amides are formed at both ends of each monomer. Alternatively, type of nylons, such as nylon 6, may be made by a ring-opening polymerization of cyclic amides (lactams).

Types of nylons are distinguished by a numerical suffix that specifies the numbers of carbons donated by the monomers. For example, for nylons with a two-number designation, such as nylon 6,6 or nylon 6,12, the first number represents the number of carbons from the diamine monomer, and the second number represents the number of carbons from the diacid monomer. For nylons having a single number designation, such as nylon 4 or nylon 6, the number represents the number of carbon atoms in the repeating monomer units.

The 6 carbon commodity chemical caprolactam has global production on the order of 2 million metric tons per year. A major use of this commodity chemical is as a monomer in the manufacture of nylon 6. Current industrial processes for the manufacture of caprolactam use petrochemically derived benzene as the raw material. Efforts are being made to replace this petrochemically derived raw material with alternative raw materials, such as those that may be derived from biomass. Replacing current petrochemically derived caprolactam with biomass derived compounds may contribute to reducing greenhouse gas emissions. There remains a need to provide alternative scalable approaches for commercial production of nylon 6 from alternative raw materials.

SUMMARY

Nylon 6 may be produced from di-substituted furanic compounds as the raw material, wherein the furanic compounds may include furans or tetrahydrofurans. The di-substituted furanic compounds may be converted to amino carbonyl compounds, and the amino carbonyl compounds may be converted into nylon 6. In an embodiment, the di-substituted furanic compounds may be derived from biomass.

In an embodiment, a method for producing nylon 6 includes converting at least one furanic compound of formula

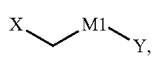

wherein M1 is

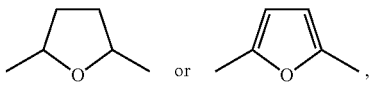

X is —F, —Cl, —Br, —I, —OH, —N$_3$, an acetate, or sulfonate, and Y is —C(O)R or —C(O)OR, to an amino carbonyl compound of formula

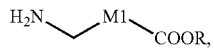

wherein R is —H, alkyl, or substituted alkyl, and converting the amino carbonyl compound to nylon 6.

In an embodiment, a method for producing caprolactam includes converting at least one furanic compound of formula

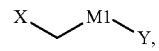

wherein M1 is

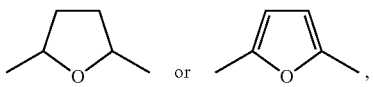

X is —F, —Cl, —Br, —I, —OH, —N$_3$, an acetate, or sulfonate, and Y is —C(O)R or —C(O)OR, to an amino carbonyl compound of formula

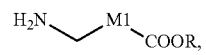

wherein R is —H, alkyl, or substituted alkyl, and converting the amino carbonyl compound to caprolactam.

In an embodiment, a method for producing a compound having a structure as represented by

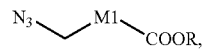

wherein M1 is

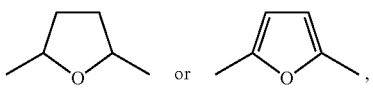

R is —H, alkyl, or substituted alkyl, includes contacting at least one furanic compound having a structure

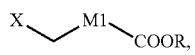

wherein X is —F, —Cl, —Br, —I, —OH, —N$_3$, an acetate, or a sulfonate, with at least one of an alkali metal azide and tetraalkylammonium azide.

In an embodiment, a polyamide may have a structure as represented by

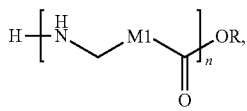

wherein M1 is

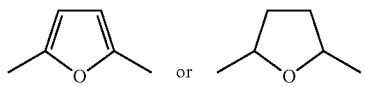

and R is —H, alkyl, or substituted alkyl.

In an embodiment, a method for producing a polyamide having a structure as represented by

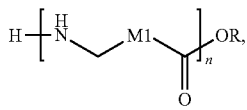

wherein M1 is

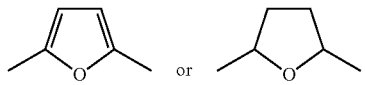

and R is —H, alkyl, or substituted alkyl, includes converting at least one furanic compound having a structure

wherein X is —F, —Cl, —Br, —I, —OH, —N$_3$, an acetate, or sulfonate, and Y comprises —C(O)R or —C(O)OR, to an amino carbonyl compound having a structure

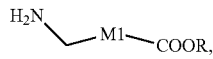

wherein R is —H, an alkyl, or a substituted alkyl, and converting the amino carbonyl compound to the polyamide.

DETAILED DESCRIPTION

Nylon 6, as indicated above, receives its numerical designation from the number of carbon atoms in its monomer units, wherein each monomer unit has 6 carbons.

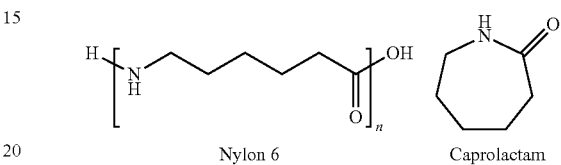

Nylon 6                Caprolactam

The 6-carbon monomers that form nylon 6 may be designated as derivatives of caprolactam.

Figure 1:
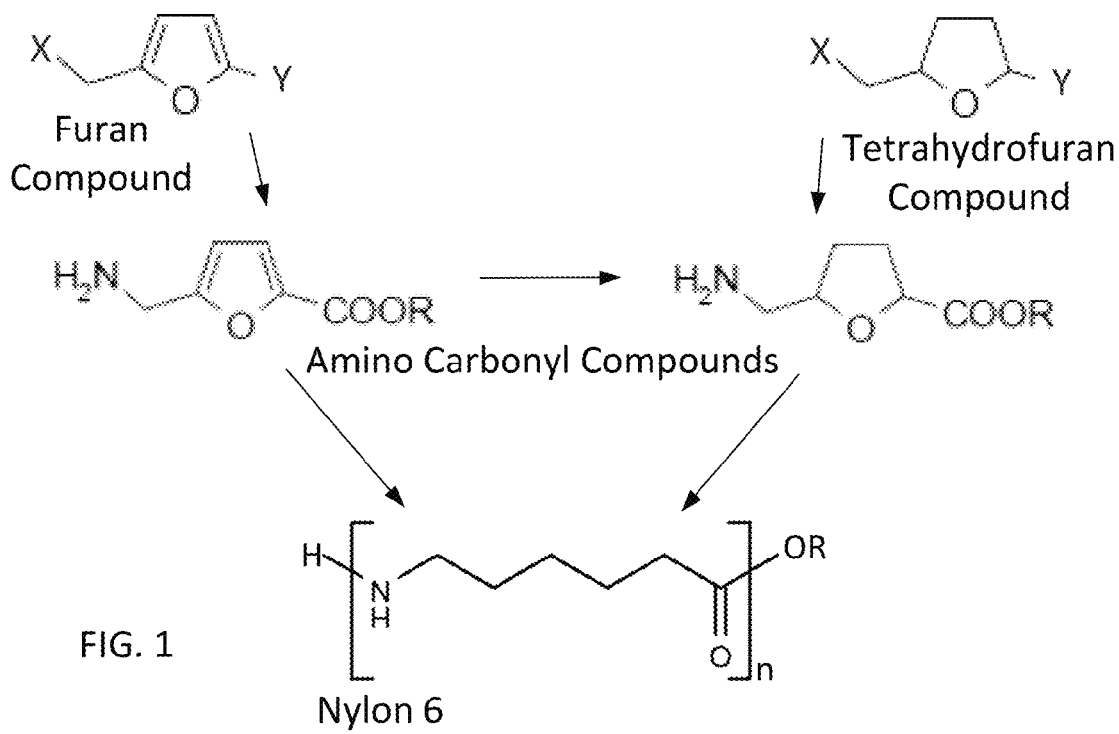
FIG. 1 generally depicts the production of nylon 6 from furanic compounds according to an embodiment.

As generally represented in FIG. 1, Nylon 6 may be produced from furanic compounds of formula

where M1 is

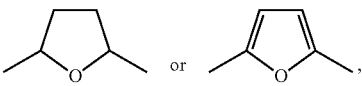

X is —F, —Cl, —Br, —I, —OH, —N$_3$, an acetate, or a sulfonate, and Y is —C(O)R or —C(O)OR, with R being —H, an alkyl, or a substituted alkyl. The furanic compounds may be converted to amino carbonyl compounds of formula

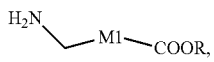

and the carbonyl compounds may be converted to nylon 6.

By using furanic compounds as raw materials for nylon 6, the use of petrochemically derived raw materials may be diminished or eliminated. Furanic compounds of the indicated formula may be derived from biomass. In an embodiment, when Y is —C(O)H and X is —OH (5-hydroxymethylfurfural, HMF) or —Cl (5-chloromethylmethylfurfural, CMF) the HMF or CMF may be directly derived from biomass or cellulose. In an alternative embodiment, hexoses may be isolated from biomass, and the hexoses converted to the furanic compounds. Hexoses may also be obtained from other sources.

Figure 2:
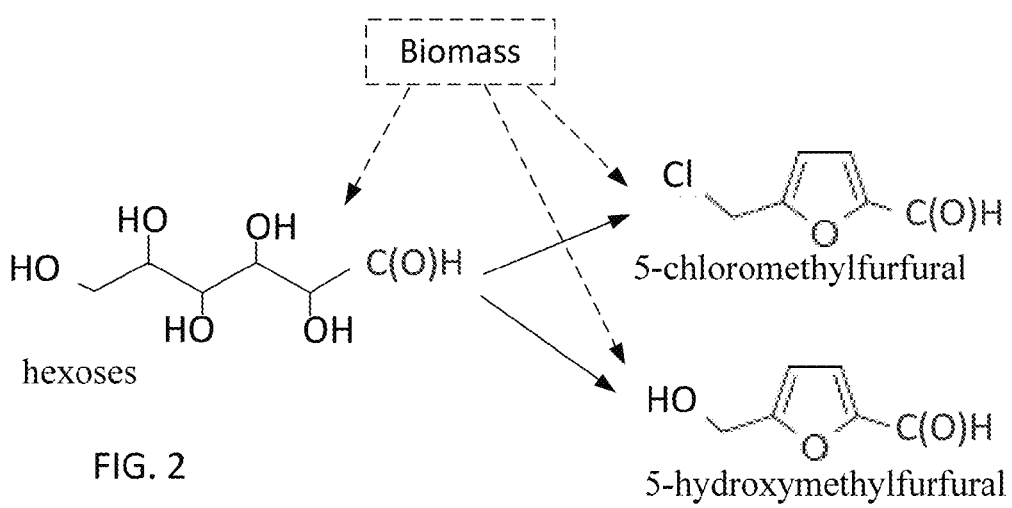
FIG. 2 generally depicts the production of furfurals from biomass according to an embodiment.

As an example, as represented in FIG. 2, the furanic compound may be 5-chloromethylfurfural (where X is —Cl and Y is —C(O)H in the above formula). Hexoses may be converted to 5-chloromethylfurfural by heating the hexoses with HCl, and 1,2-dichloroethane, with or without an alkaline salt. The alkaline salt may be lithium halide, sodium halide, potassium halide, or any combination thereof.

As an alternative example, as represented in FIG. 2, the furanic compound may be 5-hydroxymethylfurfural (where X is —OH and Y is —C(O)H in the above formula). Hexoses may be converted to 5-hydroxymethylfurfural by heating the hexoses with metal, and/or a salt or metal salt catalyst, with or without an acid. The salt/metal salt catalyst may be lithium chloride, lithium bromide, magnesium chloride, lanthanum (III) chloride, chromium (III) chloride, chromium (III) bromide, chromium (II) chloride, iron (III) chloride, copper (II) chloride, gold (III) chloride, tin (IV) chloride, aluminum (III) chloride, iridium (III) chloride, germanium (IV) chloride, ammonium chloride, ammonium bromide, tetraalkylammonium chloride, ammonium hydrosulfate, scandium (III) triflate, ytterbium (III) triflate, zirconium (IV) oxide, titanium (IV) oxide, tungsten (VI) oxide, or any combination thereof.

The furanic compound may be converted to the amino carbonyl compound, as generally represented in FIG. 1, by an oxidation reaction (converting a portion of the molecule to a carboxylic acid) and an amination (introducing an amine group onto the molecule).

Figure 3A:
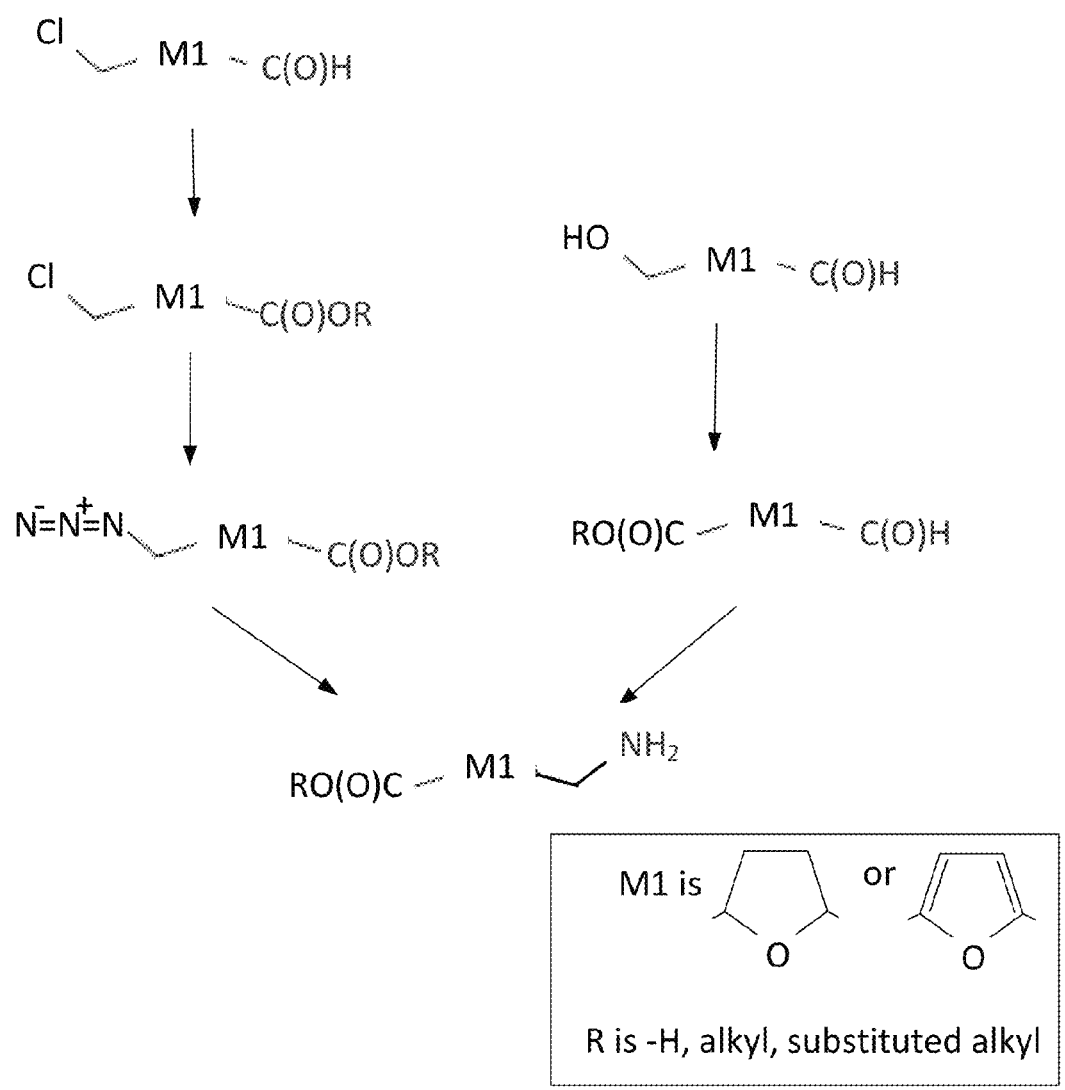
FIGS. 3A and 3B depict the conversion of furfurals to an amino carbonyl compound according to an embodiment.

In an embodiment as generally depicted in FIG. 3A, a halogenated methyl furanic compound of structural formula

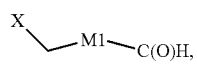

where M1 is

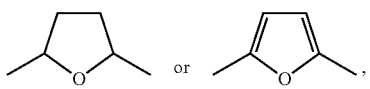

and X is a halogen, may be oxidized to form a halogenated methyl furanic compound of formula

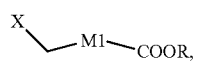

where R is —H, alkyl, or substituted alkyl. The furanic compound may be treated with an azide to replace the halogen and produce 5-(azidomethyl) furanic compounds of formula

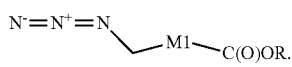

In an embodiment, the 5-(azidomethyl) furanic compounds may be produced and sold as a precursor for producing nylon 6, or for other uses.

In an embodiment, the 5-(azidomethyl) furanic compounds of formula

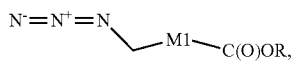

where R is —H, alkyl, or substituted alkyl, may be produced by contacting at least one furanic compound of structure

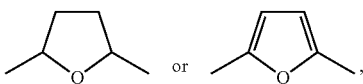

where M1 is

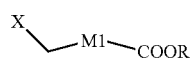

X is —F, —Cl, —Br, —I, —OH, an acetate, or a sulfonate, with a solvent and at least one of an alkali metal azide and tetraalkylammonium azide. The alkali metal azide may be sodium azide, and the tetraalkylammonium azide may be tetrabutylammonium azide. The solvent selected may be a function of the azide salt used. For example, if an alkali metal azide is used then the solvent may be dimethylformamide or dimethyl sulfoxide, whereas if tetraalkylammonium azide is used then the solvent may be less polar, such as tetrahydrofuran or 2-methyltetrahydrofuran.

Furanic compounds having the structure

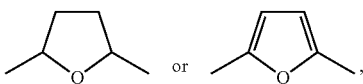

may be produced by oxidizing furanic compounds having a structure

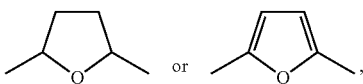

that may be derived directly from biomass, such as cellulose, or produced from biomass by isolating hexoses from the biomass, and converting the hexoses to the furfural compound. If X is —Cl, the hexoses may be converted by heating the hexoses with HCl and 1,2-dichloroethane to produce 5-chloromethylfurfural as the furfural compound.

In an embodiment, where X may be —Cl and R may be —H, the furfural compound having the structure

Figure 3B:
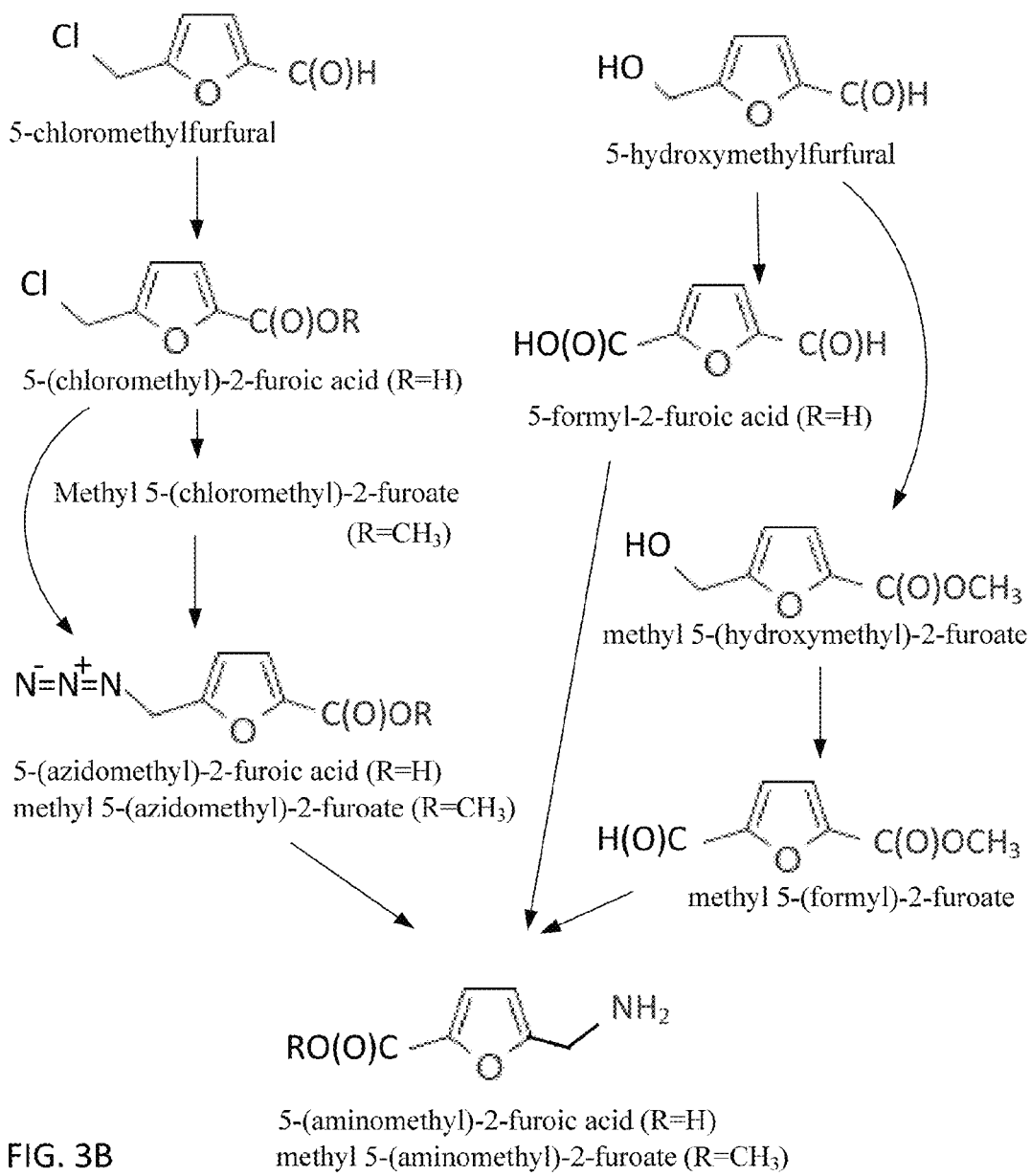

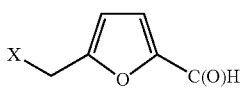

is 5-chloromethylfurfural as shown in FIG. 3B. While this example, and any examples below may be provided, illustrated and discussed for components having furan rings

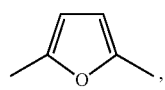

the same may generally also apply for similarly structured components wherein the furan ring is replaced with a tetrahydrofuran ring

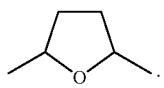

As shown in FIG. 3B, oxidation of the 5-chloromethylfurfural produces 5-(chloromethyl)-2-furoic acid. The 5-(chloromethyl)-2-furoic acid may then be contacted with a solvent, such as 2-methyltetrahydrofuran and at least one of an alkali metal azide and tetraalkylammonium azide to produce 5-(azidomethyl)-2-furoic acid. The 5-(azidomethyl)-2-furoic acid may be converted to an amino carbonyl compound 5-(aminomethyl)-2-furoic acid. In an embodiment, the 5-chloromethylfurfural may be oxidized with Jones reagent or chromic acid and at least one co-oxidant. In an embodiment, the co-oxidant may be periodic acid.

In a variant of the above reaction procedure, the 5-(chloromethyl)furoic acid may be converted into an ester by reacting the 5-(chloromethyl)furoic acid with diazomethane to produce methyl 5-(chloromethyl)-2-furoate. The methyl 5-(chloromethyl)-2-furoate may then be contacted with a solvent, such as 2-methyltetrahydrofuran, and at least one of an alkali metal azide and tetraalkylammonium azide to produce methyl 5-(azidomethyl)-2-furoate.

The methyl 5-(azidomethyl)-2-furoate may be converted to the amino carbonyl compound methyl 5-(aminomethyl)-2-furoate. In an embodiment, the azide that is reacted with the methyl 5-(chloromethyl)-2-furoate may include at least one of an alkali metal azide and tetraalkylammonium azide. In an embodiment the alkali metal azide may be sodium azide. In an embodiment, the methyl 5-(azidomethyl)-2-furoate may be converted to methyl 5-(aminomethyl)-2-furoate by catalytic hydrogenation of methyl 5-(azidomethyl)-2-furoate at room temperature in the presence of a hydrogenation catalyst. In an embodiment, the hydrogenation catalyst may be palladium, platinum, rhodium, or combinations thereof.

In an embodiment, as shown in FIG. 3B, if the furanic compound is 5-hydroxymethylfurfural, the 5-hydroxymethylfurfural may be oxidized to produce 5-formyl-2-furoic acid (5-formylfuran-2-carboxylic acid) or methyl 5-(hydroxymethyl)-2-furoate. The methyl 5-(hydroxymethyl)-2-furoate may be converted to methyl 5-(formyl)-2-furoate. The 5-formyl-2-furoic acid or methyl 5-(formyl)-2-furoate may be reacted with an ammonia source to respectively produce 5-(aminomethyl)-2-furoic acid or methyl 5-(aminomethyl)-2-furoate. In an embodiment, the 5-hydroxymethylfurfural may be oxidized with 4-benzoyloxy-2,2,6,6-tetramethylpiperidine-1-oxyl under phase transfer conditions to produce 5-formyl-2-furoic acid. In an embodiment, the ammonia source may include an ammonia equivalent in a solvent, and reacting the 5-formyl-2-furoic acid with the ammonia source may produce an intermediate imine that may be reduced with a reducing agent in a solvent to produce 5-(aminomethyl)-2-furoic acid. In an embodiment, the ammonia equivalent may be ammonia, ammonium acetate, hydroxylamine, or a combination thereof, and the reducing agent may be hydrogen, sodium borohydride, sodium cyanoborohydride, sodium acetoxyborohydride, or a combination thereof. In an embodiment, the reduction of the imine may be done in the presence of a reduction catalyst. The reduction catalyst may be nickel, palladium, platinum, rhodium, or a combination thereof. Alternatively, reductive amination of 5-formyl-2-furoic acid using a mixture of sodium cyanoborohydride, ammonium acetate, aqueous ammonium hydroxide and ethanol may also produce the amino carbonyl compound.

Figure 4:
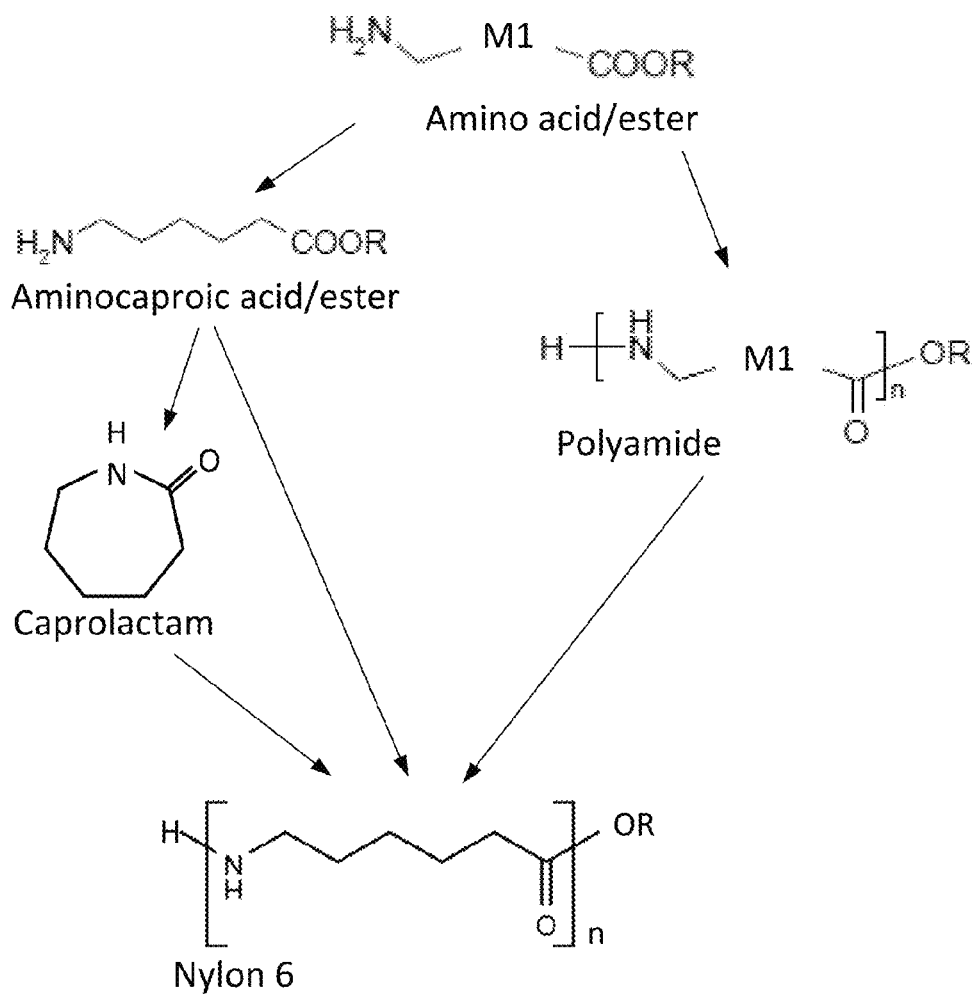
FIG. 4 depicts the conversion of an amino carbonyl compound to nylon 6 according to an embodiment.

Referring back to FIG. 1, the amino carbonyl compounds produced from the furanic compounds may be converted to nylon 6. This conversion may be done by various routes as illustrated in FIG. 4. In an embodiment, nylon 6 may be produced by a series of reactions involving hydrogenation, hydrodeoxygenation, and polymerization. In a first reaction, the amino acid or ester may be hydrogenated to reduce the furan double bonds, if present, and hydrodeoxygenated to open the ring and produce an aminocaproic acid. The aminocaproic acid may be converted to caprolactam, and, via a ring-opening polymerization, the caprolactam may be polymerized to produce nylon 6. During polymerization, the amide bond within each caprolactam molecule is broken, with the active groups on each side re-forming two new bonds as the monomer becomes part of the polymer backbone.

The hydrogenation, hydrodeoxygenation, and polymerization may be done in a single-vessel reaction sequence. A mixture of the amino carbonyl compound (amino acid or amino ester), at least one metal catalyst, at least one halide source, and hydrogen gas may be heated in stages to conduct the various reactions. In a first stage, the mixture may be heated to a first temperature of about 140° C. to about 160° C. for a period of time sufficient to convert the aminocarbonyl compound to aminocaproic acid. The temperature may then be increased to a second temperature of about 190° C. to about 210° C. for an additional period of time sufficient to convert the aminocaproic acid to caprolactam. The temperature may then be increased to a third temperature of about 240° C. to about 270° C. for another period of time sufficient to convert the caprolactam to nylon 6.

In embodiments, the metal catalyst may be platinum, palladium, rhodium, ruthenium, nickel, cobalt, iron, molybdenum, iridium, rhenium, gold, or any combination thereof. The metal catalyst may be mounted on a support. The halide source may be at least one hydrogen halide, which may be, for example, hydrogen iodide, hydrogen bromide, or a combination thereof.

In a variant of this reaction sequence, as depicted in FIG. 4, the aminocaproic acid or aminocaproic ester may be polymerized directly to nylon 6 via a polycondensation reaction.

In an embodiment, as also generally represented in FIG. 4, the amino acids or amino esters may be polymerized to produce polyamides of structure

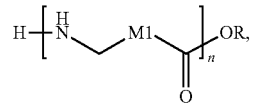

where R is —H, alkyl, or substituted alkyl. Additional hydrogenation/hydrodeoxygenation of the polyamide may produce nylon 6.

In an embodiment, a polyamide may have a structure as represented by

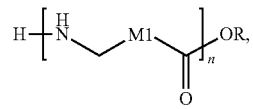

wherein M1 is

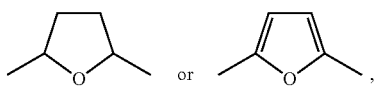

and R is —H, alkyl, or substituted alkyl. In an embodiment R may be —H or —CH₃. A polyamide having such a structure may be used as a precursor for producing nylon 6. The polyamide may be converted to nylon 6 by hydrogenating and hydrodeoxygenating the polyamide.

Figure 6:
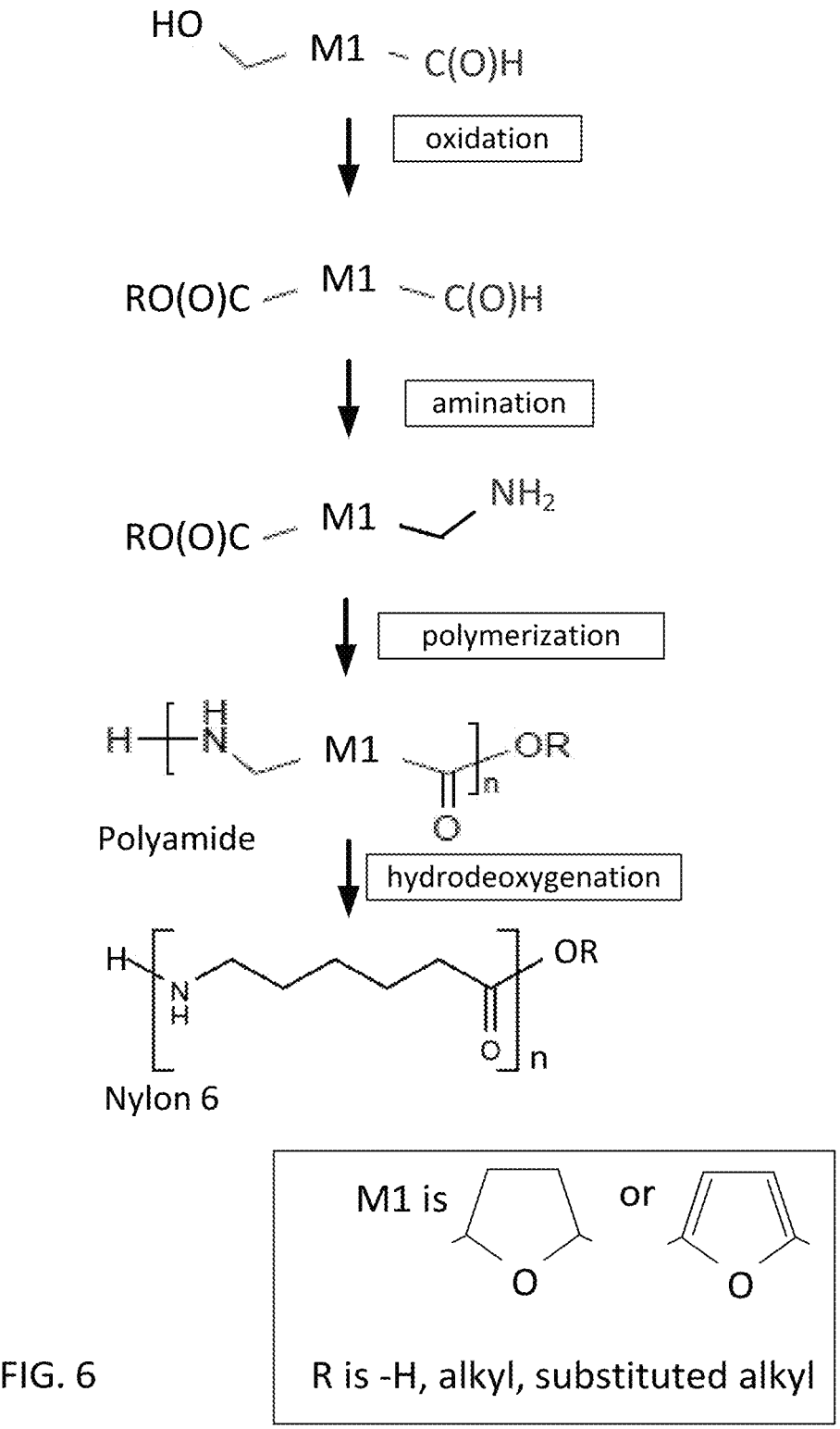
FIG. 6 illustrate a general reaction for production of nylon 6 via a polyamide route according to an embodiment.

In a reaction based on FIG. 6, a polyamide having a structure as represented by

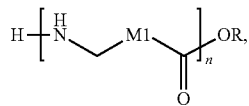

may be produced by converting at least one furanic compound having a structure

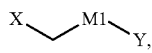

wherein X may be —F, —Cl, —Br, —I, —OH, —N₃, an acetate, or sulfonate, and Y may be —C(O)R or —C(O)OR, to an amino acid or amino ester having a structure

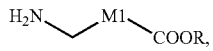

where R may be —H, an alkyl, or a substituted alkyl. The amino acids or amino esters may then be converting to the polyamide. The amino acids or amino esters may be converted to polyamides by polymerization of the amino acids or amino esters. In an embodiment, Y may be —C(O)H and X may be —Cl or —OH.

As mentioned previously, the furanic compound may be derived directly from biomass, or may be produced from biomass by isolating hexoses or cellulose from the biomass, and converting the hexoses or cellulose to the furanic compound. In an embodiment, where X is —Cl and Y is —C(O)H, converting the hexoses or cellulose may be converted to the furanic compound by heating the hexoses or cellulose with HCl and 1,2-dichloroethane to produce 5-chloromethylfurfural as the furanic compound. In a variant, an alkaline salt may be heated with the hexoses, HCl and 1,2-dichloroethane to produce the 5-chloromethylfurfural. The alkaline salt may be lithium halide, sodium halide, potassium halide, or any combination thereof.

In an embodiment for furan compounds, which, as mentioned above, may also be applicable for tetrahydrofuran compounds, where X is —Cl and Y is —C(O)H, conversion of the at least one furan compound to the amino acid may include oxidizing 5-chloromethylfurfural to produce 5-(chloromethyl)-2-furoic acid, contacting the 5-(chloromethyl)-2-furoic acid with a solvent, such as 2-methyltetrahydrofuran, and at least one of an alkali metal azide and tetraalkylammonium azide to produce 5-(azidomethyl)-2-furoic acid, and converting the 5-(azidomethyl)-2-furoic acid to the amino acid 5-(aminomethyl)-2-furoic acid. In embodiments, the alkali metal azide may be sodium azide, and the tetraalkylammonium azide may be tetrabutylammonium azide.

The 5-(azidomethyl)-2-furoic acid may be converted to 5-(aminomethyl)-2-furoic acid by catalytic hydrogenation of 5-(azidomethyl)-2-furoic acid at room temperature in the presence of a hydrogenation catalyst. The hydrogenation catalyst may be palladium, platinum, rhodium, or any combination thereof. The 5-chloromethylfurfural may be oxidized with at least one of: Jones reagent, and chromic acid and at least one co-oxidant. The co-oxidant may be periodic acid.

For furanic compounds where X is —OH and Y is —C(O)H, converting hexoses or cellulose to the furanic compound may include heating the hexoses or cellulose with at least one of an acid and a metal salt catalyst to produce 5-hydroxymethylfurfural as the furanic compound. The step of converting the at least one furanic compound to the amino carbonyl compound may then include oxidizing the 5-hydroxymethylfurfural to produce 5-formyl-2-furoic acid or methyl 5-formyl-2-furoate, and contacting the 5-formyl-2-furoic acid or methyl 5-formyl-2-furoate with an ammonia source to produce the amino carbonyl compound 5-(aminomethyl)-2-furoic acid or the amino ester methyl 5-(aminomethyl)-2-furoate. In an embodiment, the 5-hydroxymethylfurfural may be oxidized with 4-benzoyloxy-2,2,6,6-tetramethylpiperidine-1-oxyl under phase transfer conditions.

In an embodiment, the ammonia source may be an ammonia equivalent in an appropriate solvent, and upon contacting the 5-formyl-2-furoic acid or methyl 5-formyl-2-furoate with the ammonia source, an intermediate imine may be produced. The intermediate imine may be reduced with a reducing agent in a solvent to produce 5-(aminomethyl)-2-furoic acid or methyl 5-(aminomethyl)-2-furoate. In an embodiment, the intermediate imine may be reduced with the reducing agent in the presence of a reduction catalyst. In various embodiments, the ammonia equivalent may be ammonia, ammonium acetate, hydroxylamine, or a combination thereof, and the reducing agent may be hydrogen, sodium borohydride, sodium cyanoborohydride, sodium acetoxyborohydride, or a combination thereof.

EXAMPLES

Example 1: Method for Producing a Furanazido Acid or Furanazido Ester from 5-Chloromethylfurfural—and Conversion to an Amino Acid or Amino Ester Furanazido acids or Furanazido esters are provided as precursor compounds for producing nylon 6. FIG. 3B depicts a representation of a method for producing 5-(azidomethyl)-2-furoic acid and methyl 5-(azidomethyl)-2-furoate from furanic compounds. One furanic compounds that is usable for producing 5-(azidomethyl)-2-furoic acid and methyl 5-(azidomethyl)-2-furoate is 5-chloromethylfurfural. As discussed previously, 5-chloromethylfurfural is commercially available (such as from Toronto Research Chemicals, Inc.; Toronto, Canada) or obtainable from biomass and other sources.

A solution of 5-(chloromethyl)furfural (1 equivalent) in isopropanol free acetone is cooled in an ice bath. Jones reagent is added slowly until the yellow color persists. The reaction is quenched with isopropanol, the mixture is concentrated under reduced pressure, and the residue is extracted with ethyl acetate. The extract is washed with 1 M hydrochloric acid, washed with water, dried over magnesium sulfate, and concentrated under reduced pressure to yield 5-(chloromethyl)-2-furoic acid.

A solution of 5-(chloromethyl)-2-furoic acid in diethyl ether is cooled in an ice bath. A diethyl ether solution of diazomethane is added slowly until the yellow color persists.

After being stirred for about 10 minutes, the ether is removed under reduced pressure to yield methyl 5-(chloromethyl)-2-furoate.

A mixture of methyl 5-(chloromethyl)-2-furoate (1 equivalent), tetrabutylammonium azide (1 equivalent) and 2-methyltetrahydrofuran as solvent is stirred for about 1.5 hours. After being washed twice with a 1:1 mixture of brine and 1 M hydrochloric acid, the solution is dried over magnesium sulfate and concentrated under reduced pressure to yield methyl 5-(azidomethyl)-2-furoate.

In a similar manner, 5-(azidomethyl)-2-furoic acid is also synthesized from 5-(chloromethyl)-2-furoic acid.

Methyl 5-(azidomethyl)-2-furoate is converted to methyl 5-(aminomethyl)-2-furoate by treating a mixture of methyl 5-(azidomethyl)-2-furoate (1 equivalent), 10% palladium on carbon (0.03 equivalent palladium), concentrated hydrochloric acid (1.1 equivalents), and methanol as solvent, with hydrogen gas (about 30 psi) for about 3 hours. The catalyst is removed by filtration and rinsed with methanol. The combined filtrates are concentrated under reduced pressure. Trituration of the residue with diethyl ether yields methyl 5-(aminomethyl)-2-furoate hydrochloride salt.

Example 2: Method for Producing Furan Acid or Furan Ester from 5-Hydroxymethylfurfural—and Conversion to an Amino Acid or Amino Ester Furan acids or furan esters are provided as precursor compounds for producing nylon 6. FIG. 3B depicts a representation of a method for producing 5-formyl-2-furoic acid and methyl 5-(hydroxymethyl)-2-furoate from furanic compounds. One furanic compound that is usable for producing 5-formyl-2-furoic acid and methyl 5-(hydroxymethyl)-2-furoate is 5-hydroxymethylfurfural.

Figure 7A:
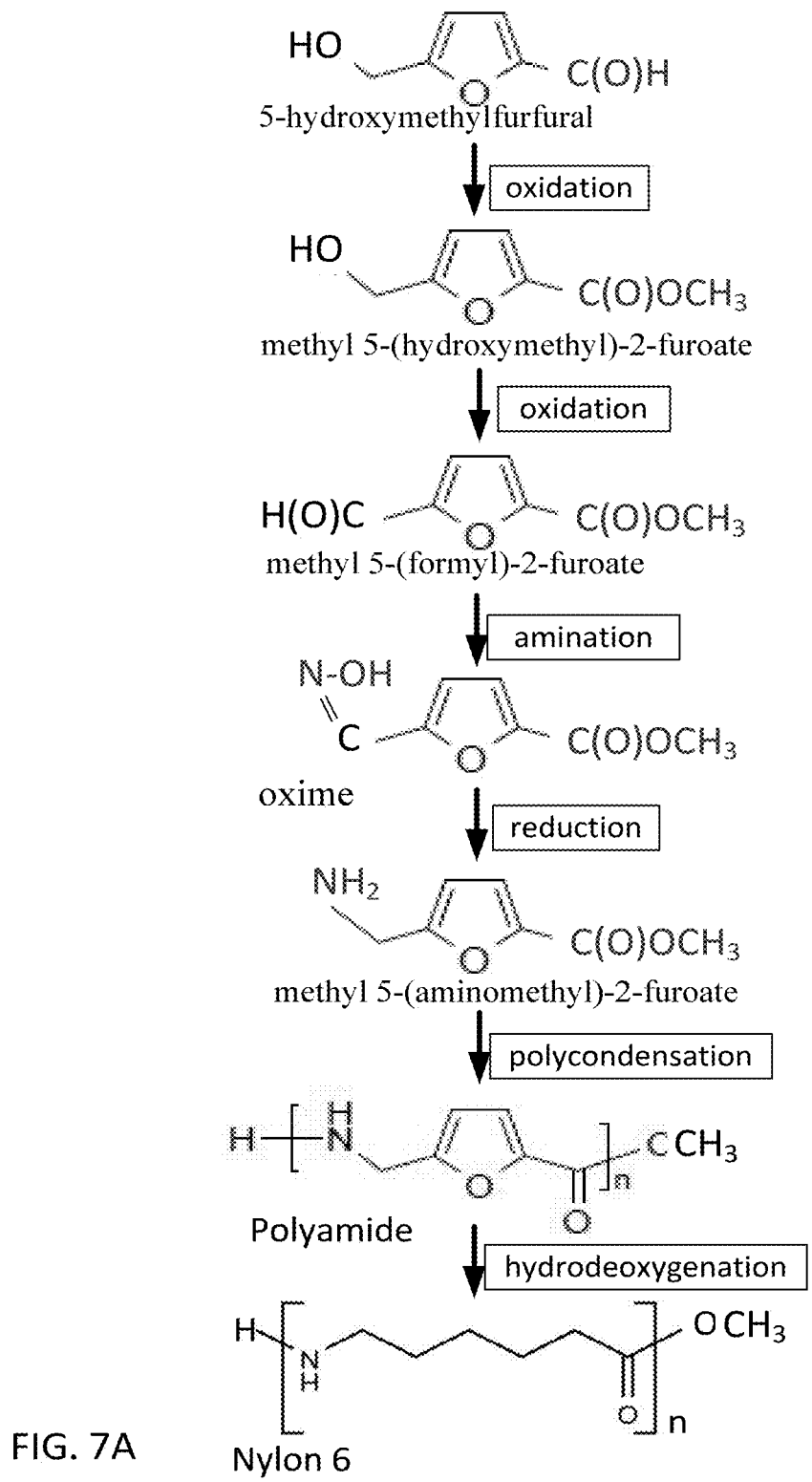
FIGS. 7A and 7B illustrate detailed reactions for producing Nylon 6 from furan polyamides.

In one process, as shown in FIG. 7A, methyl 5-(hydroxymethyl)-2-furoate is synthesized from 5-(hydroxymethyl)furfural by treating a mixture of 5-(hydroxymethyl)furfural (1 equivalent), potassium methoxide (0.25 equivalent), gold on titanium oxide catalyst (0.005 equivalent gold) and methanol as solvent, with oxygen gas (1 atmosphere) for about 24 hours. The catalyst is removed by filtration and rinsed with methanol. The combined filtrates are concentrated under reduced pressure to yield methyl 5-(hydroxymethyl)-2-furoate. A mixture of methyl 5-(hydroxymethyl)-2-furoate (1 equivalent), o-iodoxybenzoic acid (3 equivalents), and ethyl acetate as solvent, is heated under reflux for about 3 hours. Byproducts are removed by filtration and the filtrate is concentrated under reduced pressure to yield methyl 5-formyl-2-furoate. A mixture of methyl 5-formyl-2-furoate (1 equivalent), hydroxylamine hydrochloride (1 equivalents), potassium acetate (1 equivalents) and 50% aqueous ethanol is heated at 50° C. for 1 hour. After cooling, the precipitate is filtered, washed with water and dried under reduced pressure to yield methyl 5-formyl-2-furoate oxime.

Figure 5:
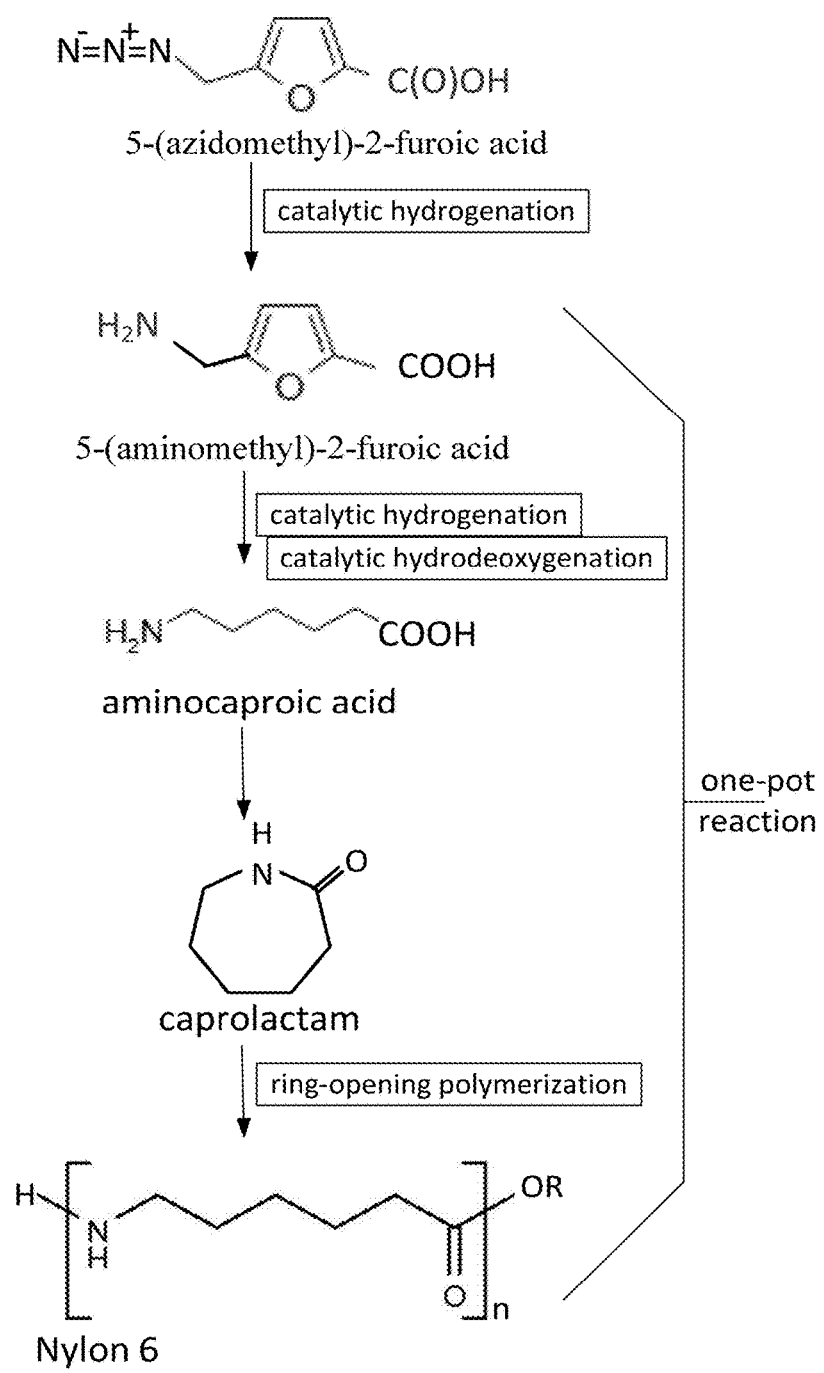
FIG. 5 illustrates a more detailed production of nylon 6 from a furan azidoacid precursor according to an embodiment.
Figure 7B:
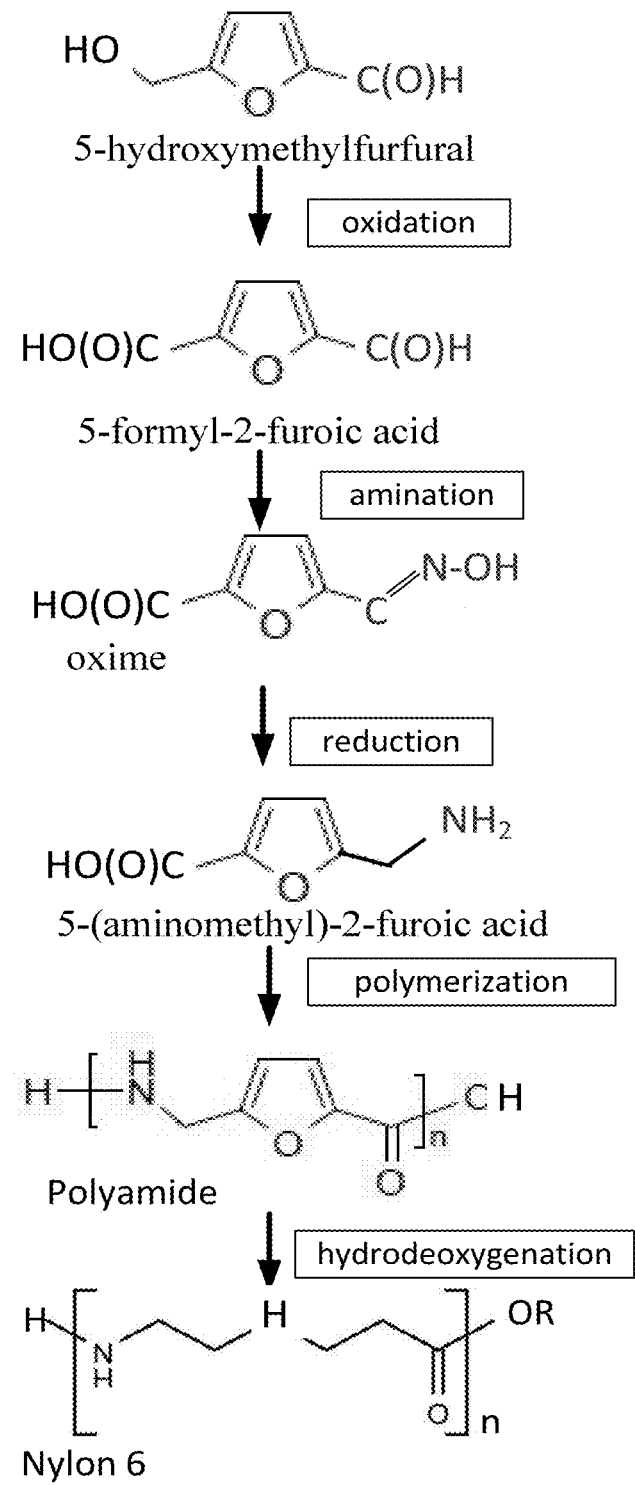

In an alternative process, as shown in FIG. 7B, 5-formyl-2-furoic acid is synthesized from 5-(hydroxymethyl)furfural by vigorously stirring a two phase mixture of 5-(hydroxymethyl)furfural (1 equivalent), 4-benzoyloxy-2,2,6,6-tetramethylpiperidine-1-oxyl (0.1 equivalent), acetylcholine chloride (0.1 equivalent), saturated aqueous sodium bicarbonate solution, and tetrahydropyran. Pyridinium tribromide (3 equivalents) is added to the mixture in portions. After being stirred for about 5 hours, the reaction is quenched by addition of 5% aqueous sodium thiosulfate solution, acidified by addition of aqueous tartaric acid, and extracted with tetrahydropyran. The extract is concentrated under reduced pressure to yield 5-formyl-2-furoic acid. A mixture of 5-formyl-2-furoic acid (1 equivalent), hydroxylamine hydrochloride (1 equivalent), 10% aqueous sodium hydroxide solution (2.1 equivalents sodium hydroxide) and ethanol is heated at 50° C. After 1 hour, the mixture is treated with 10% hydrochloric acid (1.2 equivalents) and the solid is filtered to yield 5-formyl-2-furoic acid oxime.

The oximes (FIGS. 7A, 7B) are then converted to amino acids or amino esters. For example, a mixture of 5-formyl-2-furoic acid oxime, Raney nickel catalyst, and tetrahydrofuran as solvent is treated with hydrogen gas (50 bar) in an autoclave for 1 hour. The catalyst is removed by filtration and rinsed with tetrahydrofuran under argon. The combined filtrates are concentrated under reduced pressure to yield 5-(aminomethyl)-2-furoic acid. Similarly, methyl 5-formyl-2-furoate oxime may yield methyl 5-(aminomethyl)-2-furoate.

Example 3: Methods for Producing Caprolactam

Any of the synthesized amino ester, amino acid, azido ester or azido acid monomers of Examples 1 and 2 may be used for producing caprolactam. A mixture of any, or a combination of, the monomers (1 equivalent), 5% palladium on silica (0.01 equivalent palladium) and acetic acid solvent is heated in an autoclave at 160° C. while treating with hydrogen gas (50 atmospheres) for about 3 hours. The mixture is cooled, hydrogen iodide (1 equivalent) is added, and the mixture is again heated at about 160° C. while treating with hydrogen gas (about 50 atmospheres) for about 3 additional hours. After cooling, the mixture is filtered to remove the catalyst. The solvent is removed by distillation under reduced pressure to yield 6-aminocaproic acid.

A mixture of 6-aminocaproic acid and ethanol as solvent is heated at about 200° C. while being stirred vigorously in an autoclave for about 20 minutes. Removal of the solvent under reduced pressure yields caprolactam.

Example 4: Method for Producing Nylon 6

Caprolactam is isolated and sold as a precursor for producing nylon 6 or other possible uses. Nylon 6 is also produced as a continuation of the method presented in Example 3 to provide a two-vessel conversion of 5-(aminomethyl)-2-furoic acid, methyl 5-(aminomethyl)-2-furoate, 5-(azidomethyl)-2-furoic acid or methyl 5-(azidomethyl)-2-furoate to nylon 6. After the formation of caprolactam in Example 3, the reaction mixture is heated to a third higher temperature of about 260° C. for a period of time of about 12 hours to open the caprolactam rings, whereby the amine ends of the molecules will react with the carboxyl end of other molecules to polymerize into nylon 6.

Nylon 6 may also be produced from any of the synthesized amino ester, amino acid, azido ester or azido acid monomers of Examples 1 and 2. A mixture of any, or a combination of, the synthesized amino ester, amino acid, azido ester or azido acid monomers (1 equivalent), 5% palladium on silica (0.01 equivalent palladium) and acetic acid solvent is heated in an autoclave at about 160° C. while treating with hydrogen gas (about 50 atmospheres) for about 3 hours. The mixture is cooled, hydrogen iodide (1 equivalent) is added and heated again at 160° C. while treating with hydrogen gas (50 atmospheres) for another 3 hours. The contents of the autoclave are pumped into a second autoclave with removal of the catalyst by filtration. After removal of acetic acid by distillation, ethanol is added to the autoclave. The mixture is heated at about 200° C. while being stirred vigorously for about 20 minutes. After removal of the solvent by distillation, water (5% by weight) is added to the autoclave and the mixture is heated at about 260° C. while maintaining the steam pressure at about 15 atmospheres for about 12 hours. Removal of water by distillation yields nylon 6.

Example 5: A Furan-Based Polyamide and Method for Producing

A furan based polyamide having the structure

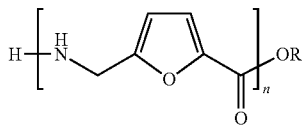

is produced from furanic compounds according to a method as represented in FIG. 7A. Such a polyamide is usable as a precursor for the production of nylon 6. One furanic compound that is usable for producing the polyamide is 5-hydroxymethylfurfural. As discussed previously, 5-hydroxymethylfurfural is obtained from biomass or other sources. 5-hydroxymethylfurfural is oxidized to produce methyl 5-hydroxymethyl-2-furoate by reacting the 5-hydroxymethylfurfural with oxygen, potassium methoxide, gold on titanium oxide catalyst, and methanol as a solvent. The methyl 5-hydroxymethylfuroate is oxidized to produce methyl 5-formylfuroate with o-iodoxybenzoic acid. The methyl 5-formylfuroate is reacted with hydroxylamine to produce an intermediate oxime that is reduced with hydrogen in the presence of a nickel catalyst to produce methyl 5-(aminomethyl)-2-furoate. The methyl 5-(aminomethyl)-2-furoate is polymerized to produce the polyamide.

Example 6: A Tetrahydrofuran-Based Polyamide and Method for Producing

A tetrahydrofuran based polyamide having the structure

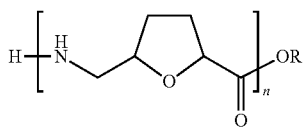

is produced from furanic compounds. Such a polyamide is usable as a precursor for the production of nylon 6. One furanic compound that is usable for producing the polyamide is 5-hydroxymethylfurfural. As discussed previously, 5-hydroxymethylfurfural is obtained from biomass or other sources. As shown in the upper portion of FIG. 7A, 5-hydroxymethylfurfural is oxidized to produce methyl 5-hydroxymethyl-2-furoate by reacting the 5-hydroxymethylfurfural with oxygen, potassium methoxide, gold on titanium oxide catalyst, and methanol as a solvent. The methyl 5-hydroxymethyl-2-furoate is oxidized to produce methyl 5-formyl-2-furoate with o-iodoxybenzoic acid. The methyl 5-formyl-2-furoate is reacted with hydroxylamine to produce an intermediate oxime that is reduced with hydrogen in the presence of a nickel catalyst to produce methyl 5-(aminomethyl)-2-furoate.

Figure 8:
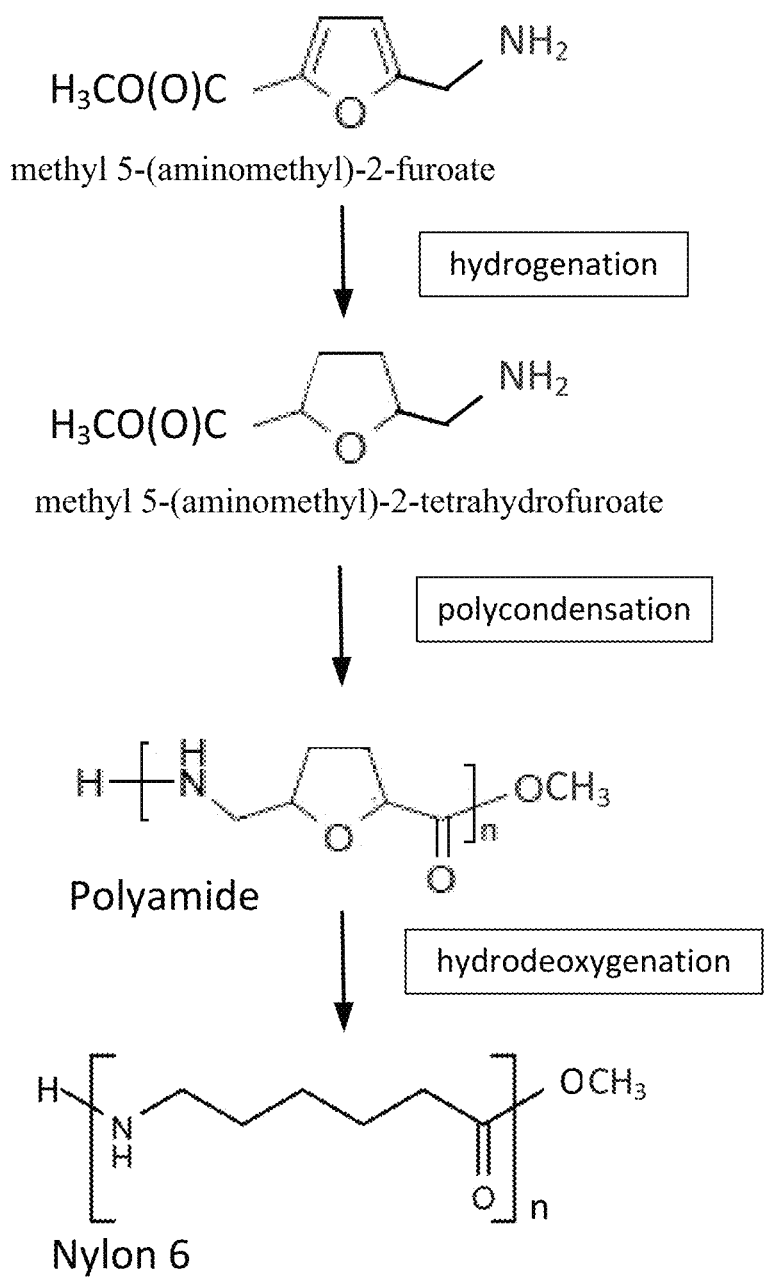
FIG. 8 illustrates an alternate method for producing nylon 6 from a tetrahydrofuran polyamide.

As shown in FIG. 8, the methyl 5-(aminomethyl)-2-furoate is catalytically hydrogenated in the presence of a halide source (HI or HBr) to produce methyl 5-(aminomethyl)-2-tetrahydrofuroate. Via a polycondensation, the methyl 5-(aminomethyl)-2-tetrahydrofuroate is polymerized to form a polyamide.

Therefore, the Examples above demonstrate that nylon 6, and precursors for making nylon 6, such as caprolactam from Example 3 and polyamide from Example 5, can be produced from furanic compounds that are derived from biomass, thereby reducing the need for petrochemically derived raw materials.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for producing nylon 6, the method comprising:
    converting at least one furanic compound of formula

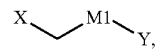

wherein
    M1 is

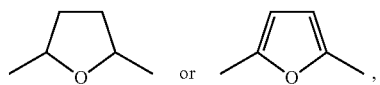

X is —F, —Cl, —Br, —I, —OH, —N$_3$, an acetate, or sulfonate, and
    Y is —C(O)R or —C(O)OR,
    to an amino carbonyl compound of formula

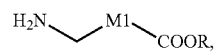

wherein R is —H, alkyl, or substituted alkyl; and
    converting the amino carbonyl compound to nylon 6.

2. The method of claim 1, wherein converting the amino carbonyl compound to nylon 6 comprises polymerizing the amino carbonyl compound by heating a mixture of the amino carbonyl compound, at least one metal catalyst, at least one halide source, and hydrogen gas.

3. The method of claim 2, wherein heating the mixture comprises:
    heating the mixture to a first temperature of about 120° C. to about 160° C. for a period of time sufficient to convert the amino carbonyl compound to aminocaproic acid to form a second mixture;
    heating the second mixture to a second temperature of about 190° C. to about 210° C. for a period of time sufficient to convert the aminocaproic acid to caprolactam to form a third mixture; and heating the third mixture to a third temperature of about 240° C. to about 270° C. for a period of time sufficient to convert the caprolactam to the nylon 6.

4. The method of claim 2, wherein the heating comprises heating a mixture having a metal catalyst including platinum, palladium, rhodium, ruthenium, nickel, cobalt, iron, molybdenum, iridium, rhenium, gold, or any combination thereof.

5. The method of claim 1, further comprising producing the furanic compound from biomass by isolating hexoses, cellulose, or a combination thereof from the biomass, and converting the hexoses, cellulose, or combination thereof to the furanic compound.

6. The method of claim 5, wherein converting the hexoses, cellulose, or combination thereof comprises converting to a furanic compound including

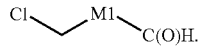

7. The method of claim 5, wherein converting the hexoses, cellulose, or combination thereof to the furanic compound comprises converting to the furanic compound including

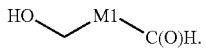

8. The method of claim 1, wherein converting the at least one furanic compound to the amino carbonyl compound comprises:
oxidizing the furanic compound

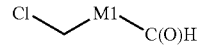

to produce

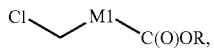

wherein R is —H, alkyl, or substituted alkyl;
contacting the

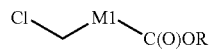

with a solvent and at least one of an alkali metal azide and tetraalkylammonium azide to produce

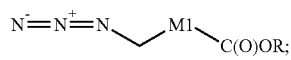

and
converting the

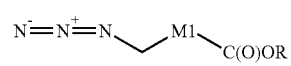

to the amino carbonyl compound

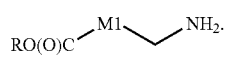

9. The method of claim 8, wherein the contacting comprises contacting with the alkali metal azide is including sodium azide and the tetraalkylammonium azide is including tetrabutyl ammonium azide.

10. The method of claim 8, wherein converting

comprises catalytically hydrogenating

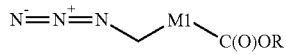

at room temperature in the presence of a hydrogenation catalyst including palladium, platinum, rhodium, or any combination thereof.

11. The method of claim 8, wherein oxidizing the

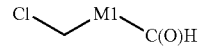

comprises oxidizing with at least one of a Jones reagent, a chromic acid and at least one co-oxidant.

12. The method of claim 8, wherein oxidizing the

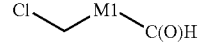

produces

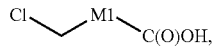

and the method further comprises contacting the

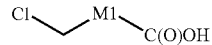

with diazomethane to produce

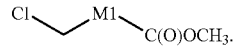

13. The method of claim 1, wherein converting the at least one furanic compound to the amino carbonyl compound comprises:
oxidizing the furanic compound

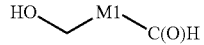

to produce

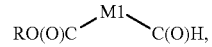

wherein R is —H, alkyl, or substituted alkyl; and
contacting the

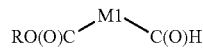

with an ammonia source to produce the amino carbonyl compound

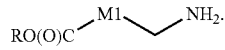

14. The method of claim 13, wherein oxidizing the

comprises oxidizing with 4-benzoyloxy-2,2,6,6-tetramethylpiperidine-1-oxyl under phase transfer conditions to produce

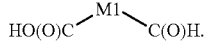

15. The method of claim 13, wherein:
contacting the

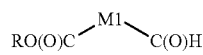

with the ammonia source produces an intermediate imine; and
 the contacting further comprises contacting the intermediate imine with a reducing agent in a solvent to produce the

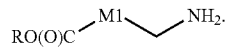

16. The method of claim 15, wherein contacting the intermediate imine further comprises contacting in the presence of a reduction catalyst including nickel, palladium, platinum, rhodium, or a combination thereof.

17. The method of claim 13, wherein:
oxidizing the

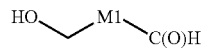

comprises oxidizing with oxygen in the presence of a gold catalyst and a solvent to produce

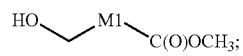

and
 the method further comprises converting

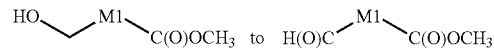

by heating the

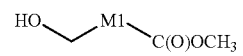

under reflux with o-iodoxybenzoic acid in the presence of a solvent.

* * * * *